US007058610B1

(12) United States Patent
Pintsov

(10) Patent No.: US 7,058,610 B1
(45) Date of Patent: Jun. 6, 2006

(54) SYSTEM AND METHOD FOR COMMUNICATING A MESSAGE IN A MAILING SYSTEM

(75) Inventor: Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 803 days.

(21) Appl. No.: 09/703,231

(22) Filed: Oct. 31, 2000

Related U.S. Application Data

(63) Continuation-in-part of application No. 09/339,768, filed on Jun. 24, 1999, now Pat. No. 6,532,452.

(51) Int. Cl.
*G06F 17/60* (2006.01)

(52) U.S. Cl. ........................ 705/62; 705/401; 705/404; 705/406; 705/407; 705/408; 705/410; 705/60; 709/206; 229/92.8; 229/300; 235/375; 380/51; 209/900; 700/227

(58) Field of Classification Search .................... 705/1, 705/60, 62, 401, 404–410; 709/206; 229/92.8, 229/300; 235/375; 380/51; 209/900; 700/227
See application file for complete search history.

(56) References Cited

U.S. PATENT DOCUMENTS

| | | | | |
|---|---|---|---|---|
| 4,106,060 A | | 8/1978 | Chapman, Jr. | 358/256 |
| 4,800,504 A | * | 1/1989 | Durst et al. | 700/221 |
| 5,008,827 A | | 4/1991 | Sansone et al. | 364/464.02 |
| 5,058,008 A | | 10/1991 | Schumacher | 364/401 |
| 5,388,049 A | | 2/1995 | Sansone et al. | 364/464.02 |
| 5,586,036 A | | 12/1996 | Pintsov | |
| 5,612,884 A | | 3/1997 | Haines | 364/464.13 |
| 5,612,889 A | | 3/1997 | Pintsov et al. | 364/478.14 |
| 5,648,916 A | | 7/1997 | Manduley | 364/514 A |
| 5,699,258 A | | 12/1997 | Thiel | 364/464.19 |
| 5,712,712 A | | 1/1998 | Sayward | 358/403 |
| 5,726,894 A | | 3/1998 | Sansone | 364/464.18 |
| 5,737,729 A | | 4/1998 | Denman | 705/401 |
| 5,768,132 A | | 6/1998 | Cordery et al. | 364/464.2 |
| 5,794,789 A | | 8/1998 | Payson et al. | 209/549 |
| 5,805,810 A | | 9/1998 | Maxwell | 395/200.36 |
| 5,826,034 A | | 10/1998 | Albal | 395/200.69 |
| 5,859,967 A | | 1/1999 | Kaufeld et al. | 395/186 |
| 5,875,302 A | | 2/1999 | Obhan | 395/200.55 |

(Continued)

FOREIGN PATENT DOCUMENTS

WO WO99/21330 4/1999

OTHER PUBLICATIONS

Kara—PCT International Application Publication No. WO 99/21330, "Postage Server System And Method"; Pub Apr. 29, 1999.*

*Primary Examiner*—James P. Trammell
(74) *Attorney, Agent, or Firm*—Charles R. Malandra, Jr.; Angelo N. Chaclas

(57) ABSTRACT

The present invention is directed to a system and method for providing confirmation and messaging relating to the distribution of a mail piece within a mailing system. Information including a mailer's address is included in a digital post mark or printed directly on the mail piece. During delivery of the mail piece, the information is read, and the mailer's address is captured. A message, which may include a mail piece image, a recipient response and physical image of a recipient, is sent to the mailer in accordance with read information.

9 Claims, 8 Drawing Sheets

U.S. PATENT DOCUMENTS

| | | | | |
|---|---|---|---|---|
| 5,892,909 A | | 4/1999 | Grasso et al. | 395/200.31 |
| 5,918,220 A | | 6/1999 | Sansone et al. | 705/408 |
| 5,936,865 A | | 8/1999 | Pintsov et al. | 364/478.14 |
| 5,978,781 A | * | 11/1999 | Sansone | 705/408 |
| 6,018,774 A | | 1/2000 | Mayle et al. | 709/250 |
| 6,038,601 A | | 3/2000 | Lambert et al. | 709/226 |
| 6,047,264 A | | 4/2000 | Fisher et al. | 705/26 |
| 6,047,273 A | | 4/2000 | Vaghi | 705/410 |
| 6,052,671 A | | 4/2000 | Crooks et al. | 705/34 |
| 6,072,862 A | | 6/2000 | Srinivasan | 379/100.08 |
| 6,216,127 B1 | | 4/2001 | Gans et al. | 707/10 |
| 6,229,884 B1 | | 5/2001 | Toyoda et al. | 379/100.08 |
| 6,233,317 B1 | | 5/2001 | Homan et al. | 379/88.05 |
| 6,233,318 B1 | | 5/2001 | Picard et al. | 379/88.17 |
| 6,289,323 B1 | | 9/2001 | Gordon et al. | 705/40 |

* cited by examiner

CONFIRMATION SYSTEM

SYSTEM AND METHOD FOR COMMUNICATING A MESSAGE IN A MAILING SYSTEM

CROSS REFERENCE TO RELATED APPLICATIONS

This application is a continuation in part of application "System and Method for Employing Digital Postage Marks as Part of Value-Added Services in a Mailing System", filed Jun. 24, 1999 now U.S. Pat. No. 6,532,452, and commonly assigned to the assignee of this application: U.S. patent application Ser. No. 09/339,768, which is specifically incorporated herein by reference.

FIELD OF THE INVENTION

The present invention relates generally to mailing systems and methods. More particularly, the present invention is directed to mailing systems and methods that evidence postage payment using digital postage marks.

BACKGROUND OF THE INVENTION

The field of communication is one of the fastest growing sectors of the economy. Two basic modes of communication are electronic and hardcopy communications. Well known examples of electronic communication are e-mail (Internet), computer facsimile and digital telephony, while a classic example of hardcopy communication is traditional mail delivery. There are also mixed forms of communication combining hardcopy and electronic modes such as traditional facsimile and hybrid mail. Both electronic and hardcopy communications offer advantages and disadvantages to users. The electronic communications, while fast and economical, lack universal coverage of traditional mail and create multiple security and legal concerns, particularly in sensitive transaction-type communications. The hardcopy mail is slower and more expensive, but it covers a vast majority of the population and offers legal proof that is frequently required in business and social endeavors.

Recently, in the United States of America and other countries, new digital methods of payment evidencing for traditional mail have been approved by respective posts. Specifically, Digital Postage Marks (DPM) (a.k.a. digital indicia, a.k.a. information-based indicia) are computerized information printed or otherwise attached to a mail item to provide an evidence of payment to a verification authority (e.g., the United States Postal Service). See for example, PERFORMANCE CRITERIA FOR INFORMATION-BASED INDICIA AND SECURITY ARCHITECTURE FOR OPEN IBI POSTAGE METERING SYSTEMS, dated Apr. 26, 1999, which is a United States Postal Service specification that defines the requirements for a system which uses a general purpose computer for printing information-based indicia in a two-dimensional barcode. When the majority of the information in the DPM is presented in the form of a two-dimensional barcode (such as DataMatrix or PDF417), the DPM can carry a very substantial amount of information that can be automatically and economically computerized, printed and later scanned using conventional computer-driven scanners. The nature of this information has been application dependent and, typically, has been oriented toward security features for verification of payment evidence. This type of information, generally referred to as postal data, preferably includes identification of the metering device (or licensee) responsible for the payment, unique identification of mail item, value of various accounting registers, location of the mail deposit/mailer's account, postage value and other similar information. Such information is typically protected by a cryptographically generated validation code known as CPVC (Cryptographic Postage Validation Code). Another way to protect DPM is by supplying the verification authority with the value of the validation code (Postage validation Code or PVC) prior to mail submission as described in U.S. Pat. No. 5,612,889, assigned to the assignee of this application.

One commonly recognized general purpose of sending a mail item is to solicit a reply message from a recipient or service provider. Such reply message may be a response to the message contained in the mail item. The reply message may also be a service type message relating to sending and/or delivering and/or receiving the mail item by either the mail recipient or the service provider, or both. The circumstance when confirmation of mail acceptance and/or delivery is required is particularly common and normally addressed by certified, registered or insured mail. These types of mail are traditionally organized around a physical proof of acceptance and delivery, such as a physical receipt, which is signed by the service provider's clerks and/or the mail recipient and physically delivered to the mail originator (mailer). The postal services incur considerable cost for such special services and value-added service, and the mailer is charged a fee that is significant in comparison to the cost of regular delivery of the mail item. For example, when a mailer requests a return receipt, the recipient of the mail signs a card stating that the mail has been received. This card is physically delivered back to the original mailer as acknowledgement of mail receipt from the recipient.

Therefore, typical physical proofs of acceptance and delivery are content limited, economically inefficient, and time-consuming. Furthermore, most, if not all, such methods require separate, essentially manual, handling of special services mail by the postal service which costs the postal service significantly more money than automated mail processing based on machine readability of information present on mail items.

As of 1998, almost 20% of the population in USA and industrial world in general have access to electronic mail via Internet. Even a higher number of mailers use facsimile regularly. These numbers are expected to grow dramatically in the future. Although such electronic communications provide speed and efficiency over the physical delivery of mail, there is no indication that such electronic communications will replace the physical delivery of mail. One solution to this problem disclosed in related application Ser. No. 09/33,768 has been to provide e-mail response rather than a physical mail item response. However, these response messages may not allow the recipient the ability to send a recipient signature image and a mail item image combined with a personalized communication to the originator. Such communication would typically require a separate, time-delayed transaction such as, for example, a return receipt mail piece, a separate e-mail message or a phone call or facsimile. Of course, those responses assume the recipient has knowledge of the original mailer's various addresses.

SUMMARY OF THE INVENTION

In accordance with the present invention, the machine-readable DPM provides a means to overcome the aforementioned difficulties at least for a considerable portion of mail stream. It has been found that the digital data in the DPM may include information that can be used for other than security and postage payment verification. For example, by including a mailer's e-mail address in the DPM, the present invention provides an opportunity to send an e-mail return receipt, which eliminates the need for a return receipt being physically delivered to the mailer. Thus, the postal service saves on the mail cost by adding this attribute to the DPM, and the savings can be passed along to the mailer.

The present invention realizes that the new digital methods of payment evidencing offer unprecedented opportunities not only to improve postal revenue collection and protection but also to create new user-friendly services that can greatly improve the appeal of traditional mail. Transition to digital methods of payment evidencing, in fact, offer an information-rich interface between mailers, posts and mail recipients that can substantially enhance advantages and features of traditional mail while simultaneously alleviating its disadvantages, such as its relatively high cost. Paradoxically, this information-rich interface can be achieved by integrating traditional hardcopy and electronic communication into one effective communication system that takes advantage of beneficial features of both media and offering end users (i.e. rate paying public) a broad selection of communication choices.

In accordance with the present invention, the DPM is treated as a message that may be used to facilitate the transfer of certain information between the mailer and the mail piece recipient. The DPM message is sent by a mailer to a service provider (carrier or post), mail item recipient and any third party interested in the information encoded in the DPM (such as, for example, a legal authority). In this regard, the DPM message can support any specific application of communication.

The present invention provides the mailer with the ability to receive an image of a mail piece in addition to confirmation of receipt and provides the recipient, upon mail piece receipt, with the ability to submit a response to the original mailer at the time of receipt, in a secure manner. Although the original mailer may receive the return receipt information in an expedited manner, the original mailer does not have the capability to receive an image of the delivered mail piece. This invention integrates electronic communication information, such as an e-mail address or any other electronic address (for example, a facsimile number, separate e-mail address or pager number), into a conventional DPM, any other predetermine identifier, or the information may be printed directly on said mail piece in a predetermined location. The invention provides the creation and communication of messages between the mailer and the recipient. Messages, such as delivery confirmation or personal response messages, are communicated in a more expeditious and effective manner. Essentially, any information about a mail item known to the carrier may be forwarded to the mailer (or other intended recipient) through an alternate electronic communication channel. This concept can be extended to provide an image of the mail item or the actual communication message. In particular, an image of a mail item communication message can be included in an e-mail response to a special service request as an evidence of the nature of delivered message. These messages may be archived at the post office or a third party data center for future access. Through use of well-known security techniques, such as cryptography, the present invention deals effectively with issues of confidentiality, message integrity, authentication and non-repudiation. These and other aspects of the present invention are covered in the detailed description of the invention.

In accordance with the present invention, a system and method is provided for sending a message to the mailer of a mail piece distributed in a postal system using information located at a predetermined location on a mail piece. The information includes the mailer's electronic address and may be located anywhere on the mail piece including the DPM. At delivery of the mailpiece into the recipient's hands, addressing information is captured from the mail piece, and a return message is created by the recipient and sent to the mailer in accordance with the captured address. Upon receipt of the mail piece, the recipient may also be required to sign for the mail piece. The physical signature and/or a copy of the mailpiece may be combined into the returned message.

Therefore, it is now apparent that the present invention substantially overcomes the disadvantages associated with the prior art. Additional advantages of the invention is will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

The present invention provides a system and method for integrating value-added services information into the DPM of a mail item to provide a more economical and efficient method of providing such value-added services. Although the present invention is described below as an e-mail implementation, it will be understood by those skilled in the art that a viable alternative includes substituting a mailer's pager number so that a pager notification of mail receipt can be used along with some other receipt data. Other viable alternatives include facsimile or automated voice response notification. Furthermore, the present invention is described for a mail item that is delivered by a postal service. It will be understood by those skilled in the art that the present invention can be used with any carrier that physically delivers any item. It will be further understood that for such other carriers, the communication information that is described herein as being integrated in the DPM may be applied in any manner to any part of the item being physically delivered. For example, the information may be part of a bar code or may be in plain text.

Furthermore, the present invention is described as having an e-mail address included in the DPM. However, it may be advantageous to include e-mail address information in the delivery address block of the mail piece, so that it can be captured and computerized during the basic mail processing step of automated mail sorting. For example, if a postal administration/carrier is not always concerned with verification of payment, it may choose to selectively scan DPM's based on some predetermined and adaptive sampling plan. On the other hand, special services, such as proof of deposit, proof of delivery and proof of receipt, require that the e-mail address of the sender be known to the postal operator/carrier. Thus, it may be important to separate postage payment security data (normally included into the DPM) and other data (e.g., special service) and position these different types of data in the different places on the mail item optimized for specific mode of mail processing and operation employed by a given postal operator or carrier. The present invention specifically provides for all different arrangements of this kind. It is noted that the three services (proof of deposit, delivery and receipt) described above are very important types of services desired by mailers, but they are not the only ones allowed by the present invention and are described below as examples only.

Figure 1:
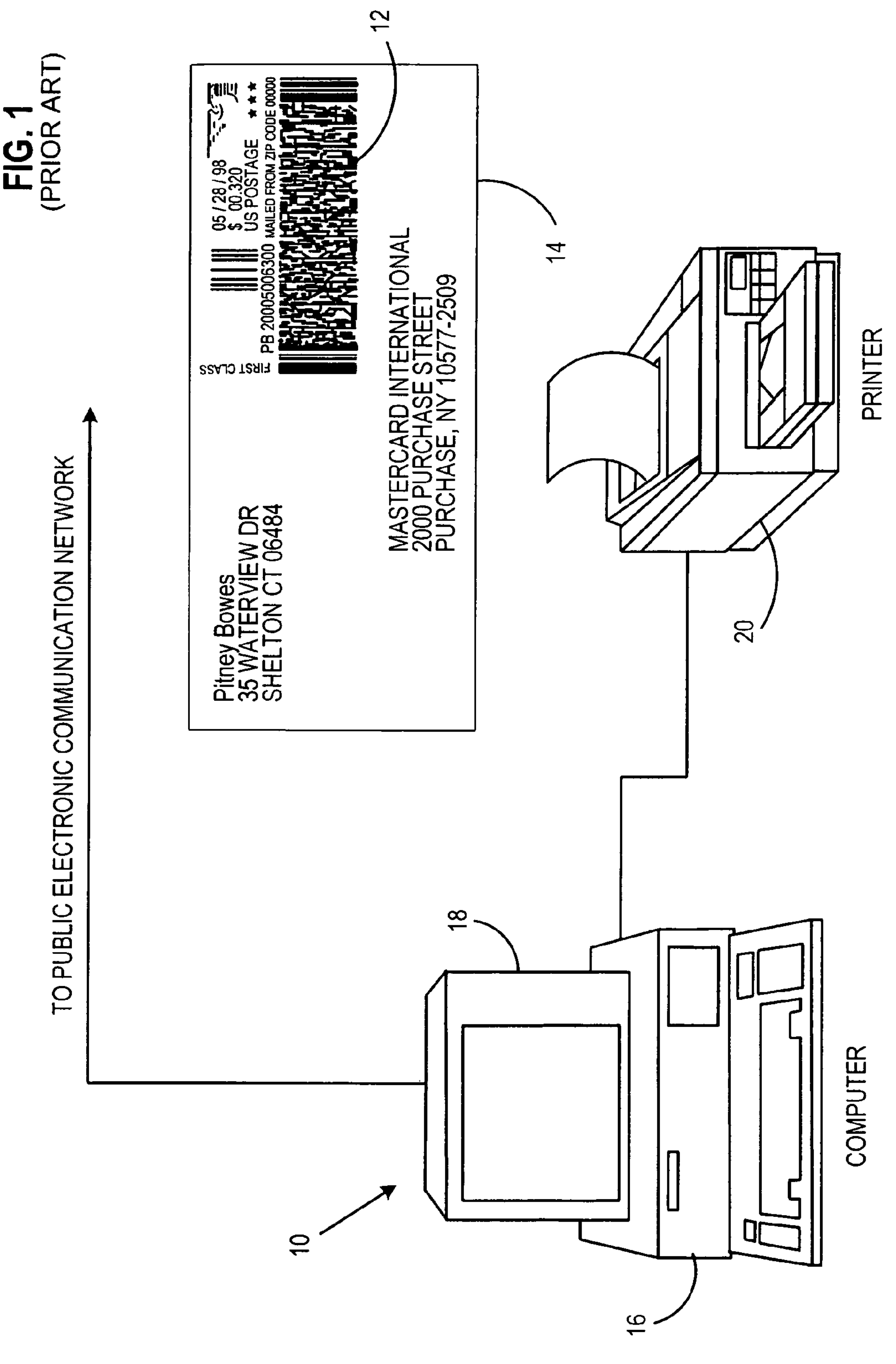
FIG. 1 (PRIOR ART)
FIG. 1 is a schematic of a prior art PC metering system as an example of a mail generation subsystem that creates and prints a DPM in accordance with the present invention.

Referring now to FIG. 1, a schematic of a prior art PC metering system, generally designated 10, is shown as an example of a mail generation system that creates and prints a DPM 12 on mail item 14 in accordance with the present invention. In accordance with the present invention, DPM 12 includes a two-dimensional bar code that contains conventional IBIP information and confirmation notification information, such as e-mail address, facsimile number, telephone number and/or pager number, and a mail item unique identification number. PC meter 10 includes conventional PC 16, display 18 and printer 10. See U.S. Pat. No. 5,781,438, assigned to the assignee of this application, which is hereby incorporated by reference for a more detailed description of a PC metering system.

Figure 2:
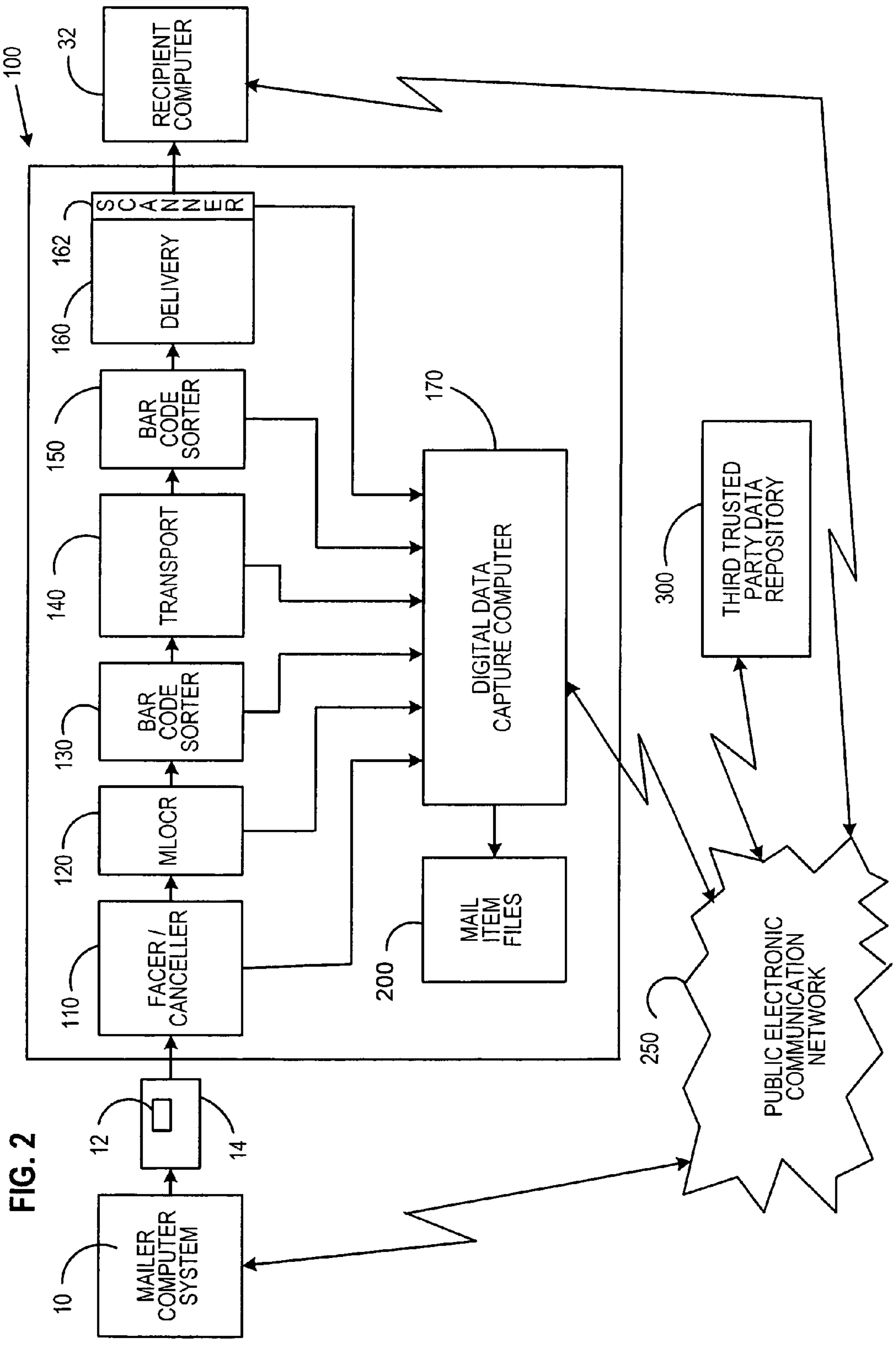
FIG. 2 is a block diagram of a postal distribution network in accordance with the present invention.

Referring now to FIG. 2, a block diagram of the system of the present invention is shown. The system includes a postal distribution network, generally designated 100, which processes a mail item 14 that originated from mailer's PC computer system 10 and delivers mail item 14 to a recipient 30 while capturing special services information in accordance with the present invention. The postal distribution network 100 includes conventional components such as: facer/canceler 110; MLOCR (multi-line optical character reader) sorters 120 that typically perform a primary sort for mail items that have not been presorted; intermediate barcode sorters 130; postal transport means 140 for transporting the mail item from one postal facility to another; final bar code sorters 150; and delivery means 160, such as a mail carrier delivery to a mailbox. Delivery means 160 includes a scanner 162 for scanning DPM 12 at the time of delivery. In accordance with the present invention, postal distribution network 100 further includes a digital data capture computer 170 that is optionally coupled to one or more of the aforementioned components of the postal distribution network 100 for the purpose of capturing information, including special services information, that is read from the DPM of the mail item being processed. As information is captured by digital data capture computer 170, a mail item file 200 (described in detail below) is created. Depending on the special services being processed, digital data capture computer 170 communicates through a public electronic communications network 250 with mailer's computer system 10, recipient's computer 32, or a third party computer 300. Communications network 250 may be any conventional communications network, such as the Internet or a cellular/conventional telephonic network, or any combination thereof depending on the type of communication information read from the DPM.

Figure 3:
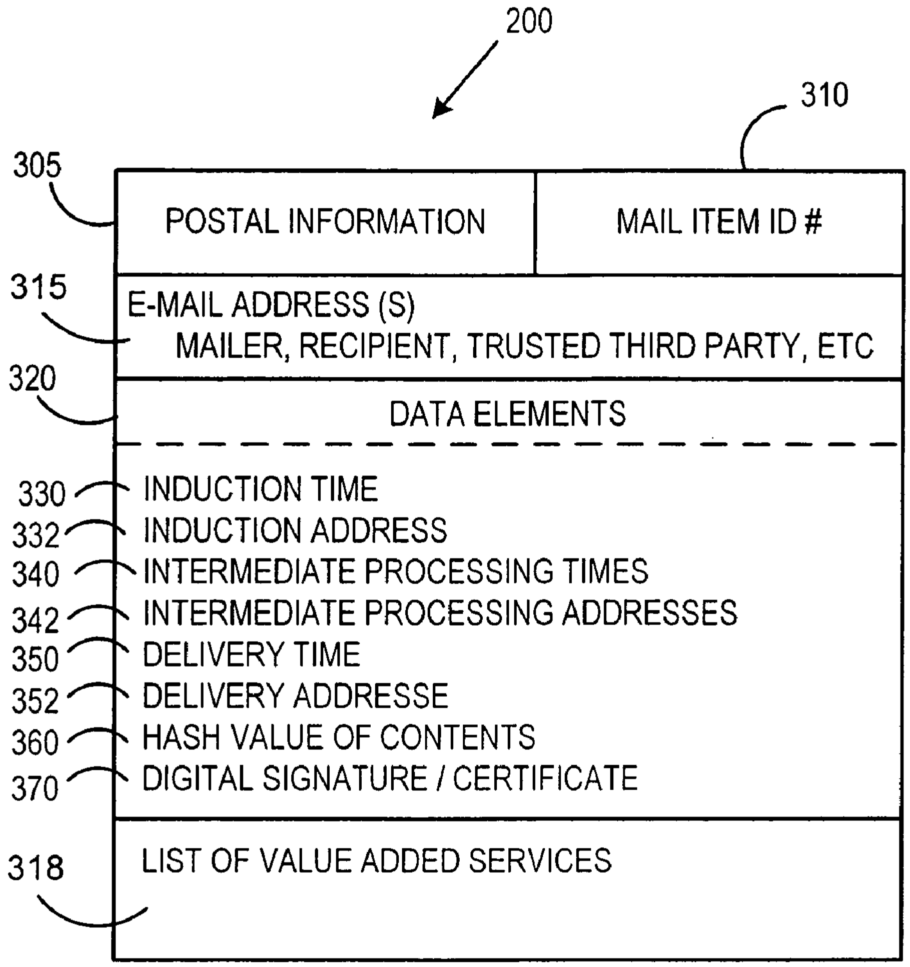
FIG. 3 is a block representation of a mail item file that is created and supplemented as the mail item is processed and delivered in accordance with the present invention.

Referring now to FIG. 3, a block representation is shown of mail item file 200 that is created and supplemented as mail item 14 is processed and delivered to recipient 30. Mail item file 200 includes: a header 305 of postal information that has been captured from an initial read of the DPM; a mail item identification number 310, which has been read from the DPM or assigned within the postal distribution network 100; a list 318 of special services requested; and one or more e-mail addresses 315. For example, the special services may direct a communication to the mailer, the recipient, a third party repository or any other party. The present invention provides for one or more of such communications. Mail item file 200 further includes various data elements 320 that are optionally captured depending on the special services requested. Data elements 320 may include induction time 330 and induction address 332 indicating when and where mail item 14 enters the postal distribution network 100, intermediate times 340 and addresses 342 indicating various stages of processing within the postal distribution network 100, and delivery time 350 and delivery address 352 indicating when and where the mail item leaves the postal distribution network 100. Data elements 320 may further include information captured when the DPM 12 was read, such as a hash 360 of the contents of mail item 14 and a digital signature and/or certificate 370.

Figure 4:
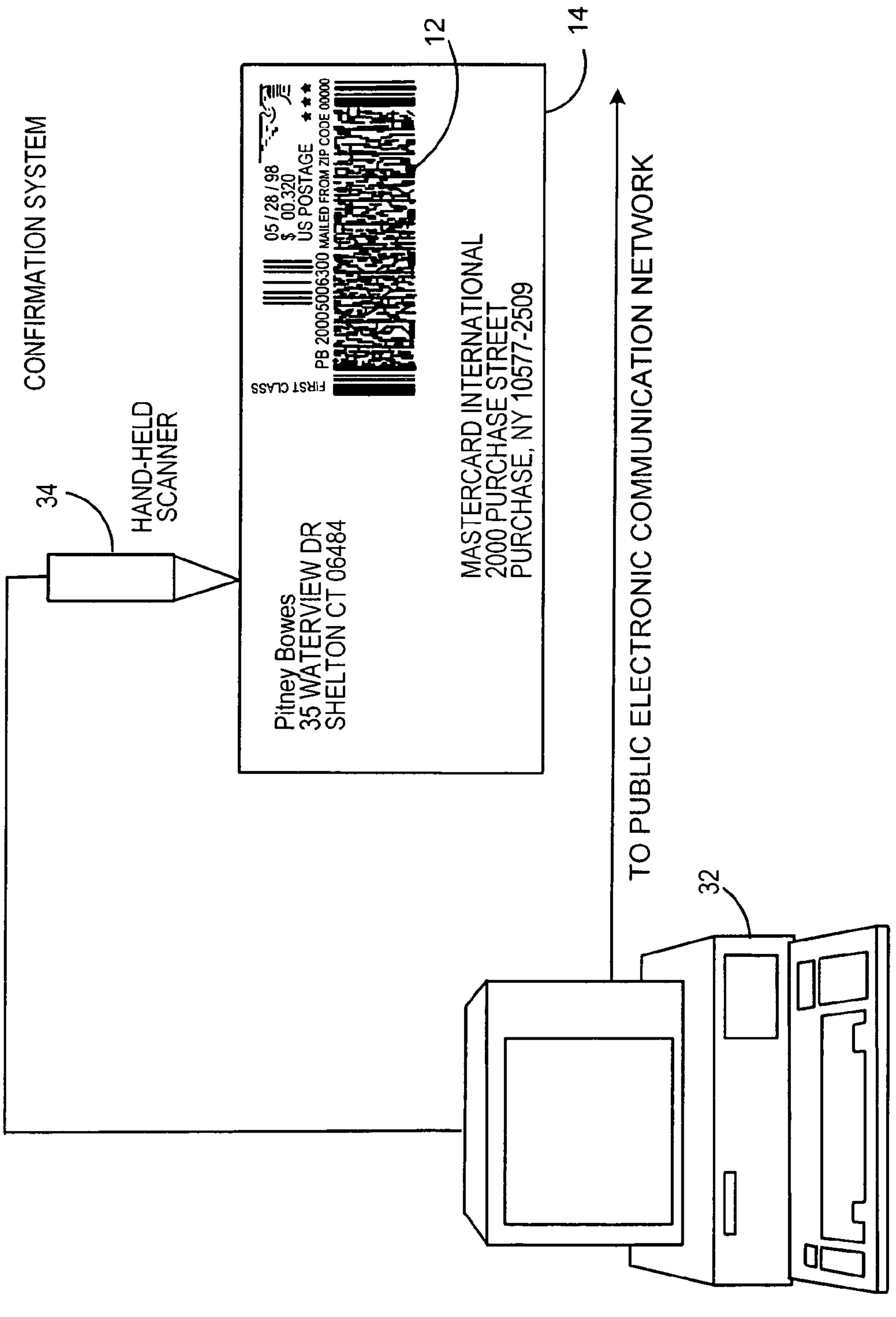
FIG. 4 is a schematic of an optional delivery confirmation subsystem used by a recipient in accordance with the present invention.

Referring now to FIG. 4, an optional delivery confirmation subsystem is shown in the form of recipient's computer 32. A hand-held scanner 34 is used by recipient 30 to read DPM 12. Recipient's computer 32 includes software, which obtains an appropriate e-mail address from DPM 12 and sends an e-mail response in accordance with information contained within DPM 12.

Figure 5:
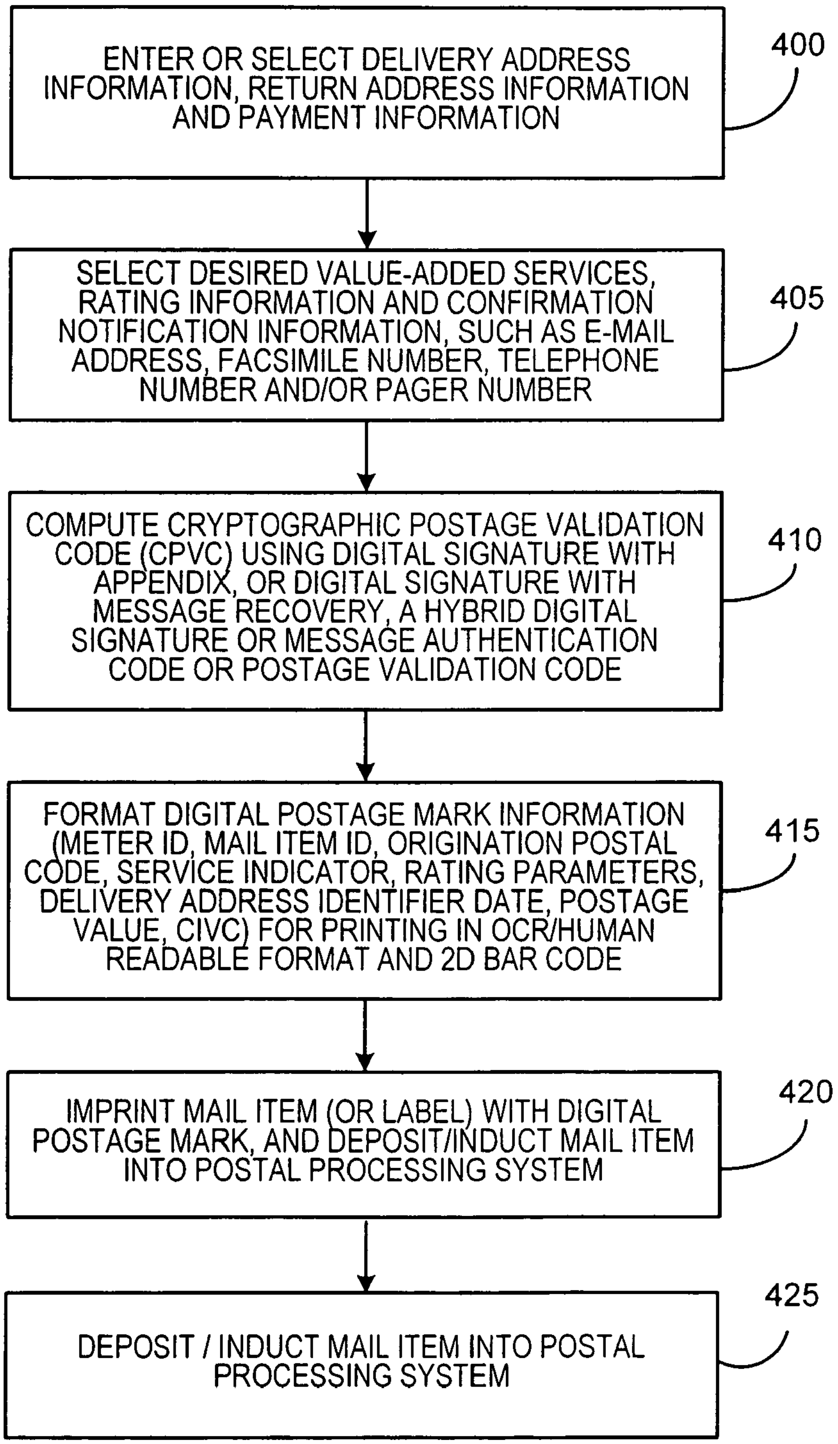
FIG. 5 is a flow chart of the process of creating the mail item to be processed by the postal distribution network of FIG. 2.

Referring now to FIG. 5, a process is shown for creating mail item 14 to be processed by the postal distribution network 100 in accordance with the present invention. Mail item 14 is created with a DPM mark that includes the mailer's e-mail address that will be used, for example, as confirmation or completion of special services requested by the mailer. Additional e-mail addresses may be included for other parties that the mailer desires to receive notice of, for example, delivery. DPM generation and/or postage payment process involves a user-selectable option to include e-mail address in encrypted form within the DPM. At step 400, using mail creation software in PC 16, a mailer enters or selects delivery address information, return address information and payment information. At step 405, the mailer selects desired special services, rating information and confirmation notification information, such as e-mail address, facsimile number, telephone number and/or pager number. It will be understood that the e-mail address may be automatically retrieved when the special services are selected. It will also be understood that the fee associated with the selected special services will be accounted for accordingly. At step 410, a cryptographic postage validation code (CPVC) is computed, for example, using digital signature with appendix, or digital signature with message recovery, a hybrid digital signature or message authentication code or postage validation code. At step 415, DPM 12 (including meter ID, mail item ID, origination postal code, service indicator, rating parameters, delivery address information, date, postage value and CPVC) is formatted for printing in OCR/human readable format and two-dimensional bar code. At step 420, mail Item 14 is printed by printer 20 with DPM 12. At step 425, mail item 14 is deposited into the postal distribution network 100.

Figure 6A:
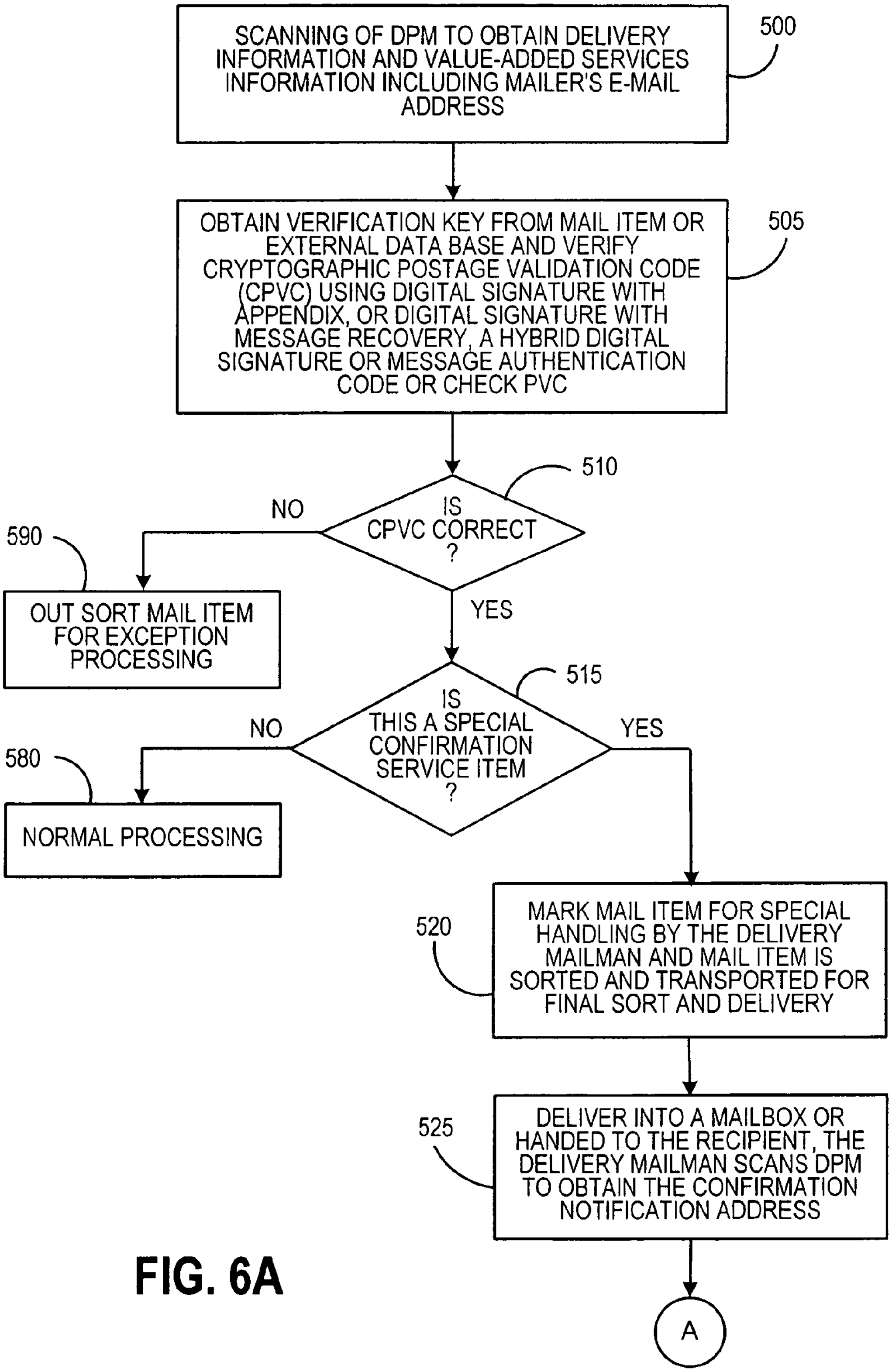
FIGS. 6A and B are flow charts of the processing of the mail item by the postal distribution network of FIG. 2.
Figure 6B:
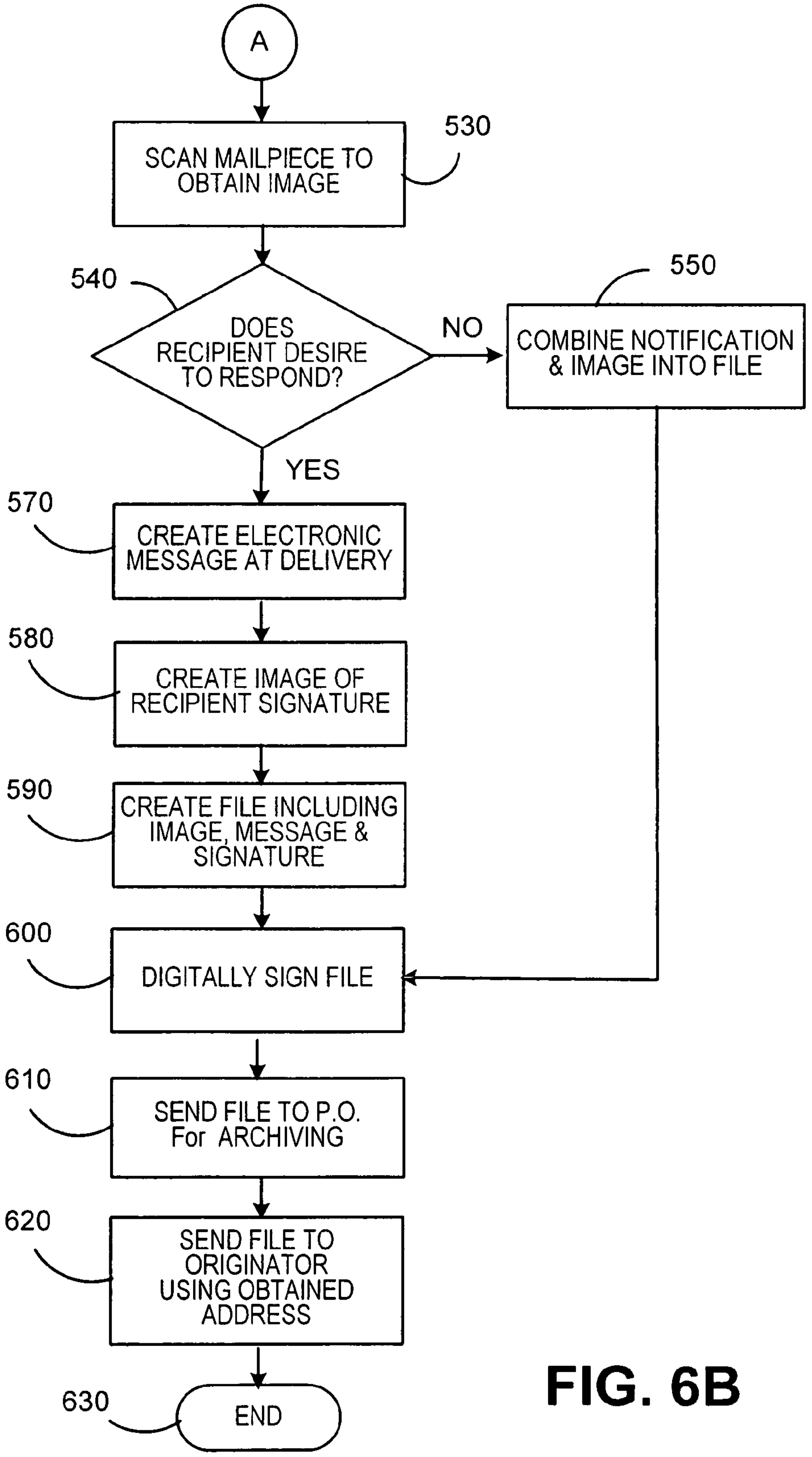

Referring now to FIGS. 6A and 6B, there is shown a flow chart of the processing of mail item 14 by postal distribution network 100. At step 500, the processing of mail item 14 begins with the scanning of DPM 12, which provides delivery information and special services information including mailer's e-mail address. A mail piece image may also be obtained at step 500, or the image may be scanned in upon delivery. At step 505, a verification key is obtained from DPM 12 or an external database, and the CPVC is verified using digital signature with appendix, digital signature with message recovery, a hybrid digital signature or message authentication code or postage validation code. At step 510, if the CPVC is not correct, then at step 590, mail item 14 is outsorted. If the CPVC is correct, then a check is made at step 515 to determine whether confirmation of special services has been requested. If not, then normal processing continues at step 580. If confirmation of special services has been requested, then at step 520, mail item 14 is marked for special handling by the delivery mail carrier, and mail item 14 is sorted and transported for final sort and delivery. At step 525, when mail item 14 is delivered into a mailbox or handed to the recipient, the delivery mail carrier scans DPM 12 to obtain the confirmation notification address. Alternatively, or additionally, the recipient may scan DPM 12 to obtain the confirmation notification address for sending the notification or an additional related message. The method flow proceeds from step 525 to step 530 where an image of the mail piece is scanned, if the image was not scanned at step 500. The image may include either the entire mail item contents or only the mail piece envelope. At step 540, the recipient is queried as to whether or not the recipient desires to provide a response to the originator of the mail piece. If the answer to the query at step 540 is "no", then at step 550, the response and mail piece image are combined into a message, the method continues to step 600 as described herein below.

If, however, at step 540, the recipient does decide to respond to the mailer, then the method progresses to step 570, where the recipient composes a response message. The response may compose the message directly, on an electronic data collection device, or on a printed form which would be later scanned into the system for return delivery. At step 580, the recipient signs the electronic data collection device to create a digital image of his/her signature. Again, this may be completed on an electronic data collection device or on a print form which later will be scanned into the postal system for return delivery. At step 590, a message containing the scanned form, including the mail piece image, signature and response message, is created. At step 600, the message may be signed digitally, and at step 610, the signed message may be sent to a postal service file for archiving. At step 620, using the address obtained at step 525, the file is then sent to the originator of the mail piece, and the message response system ends at step 630.

Figure 7:
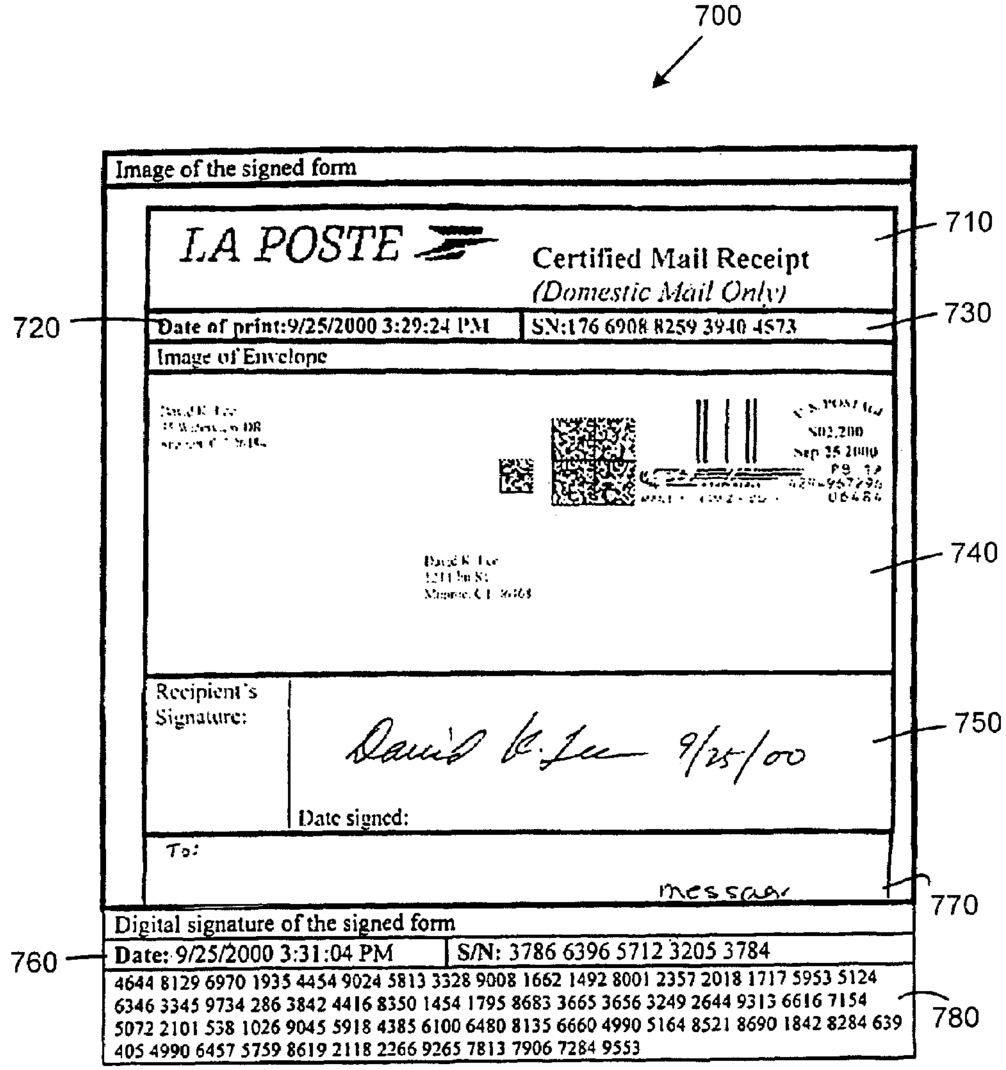
FIG. 7 is an example of a mail item image returned to the original sender.

Now turning to FIG. 7, there is shown an example of the mail item image 700 which may be created at method flow step 530 and returned to the original sender. The image includes, but is not limited to, a service indicator 710, date of print 720, date of signature 760, mail item serial no. 730, mail piece image 740, physical signature image 750, and response message 770, and digital certificate 780.

Many features of the embodiments disclosed herein represent design choices selected to exploit the inventive concept as implemented in a particular mailing system environment. However, those skilled in the art will recognize that various modifications can be made without departing from the spirit of the present invention. Therefore, the inventive concept in its broader aspects is not limited to the specific details of the preferred embodiments described above, but is defined by the appended claims and their equivalents.

What is claimed is:

1. A method for acknowledging the delivery of a mail piece within a mailing system, the method comprising the steps of:

capturing an electronic image of the mail piece;

capturing an image of a recipient's signature when a mail piece is delivered to the recipient;

capturing a response message composed by the recipient when the mail piece is delivered; and combining the captured electronic image of the mail piece, the captured image of the recipient's signature and the captured response message to form an electronic message response acknowledging receipt of the mail piece.

2. The method of claim 1 comprising the further steps of:

determining an electronic address of an originator of the mail piece; and sending the electronic message response to the originator of the mail piece.

3. The method of claim 2 wherein the electronic address of the originator is an e-mail address obtained by scanning the mail piece.

4. The method of claim 3 wherein the steps of determining the electronic address of the originator of the mail piece and sending the electronic message response to the originator of the mail piece are performed with the electronic data collection device.

5. The method of claim 3 comprising the further steps of:

digitally signing the electronic message response; and archiving the signed electronic message response.

6. The method of claim 1 wherein the steps of capturing the image of the recipient's signature and capturing the response message are performed with an electronic data collection device.

7. The method of claim 1 wherein the steps of capturing the image of the recipient's signature and capturing the response message include a further step of:

scanning a printed form containing the recipient's signature and response message to obtain an electronic image of the image of the recipient's signature and the response message.

8. The method of claim 1, wherein the step of capturing the response message is optional.

9. The method of claim 1 comprising the further step of:

determining that an originator of the mail piece has requested delivery confirmation.

* * * * *